United States Patent
Lei et al.

(10) Patent No.: US 12,438,652 B2
(45) Date of Patent: Oct. 7, 2025

(54) METHOD AND APPARATUS FOR DETERMINING HYBRID AUTOMATIC REPEAT REQUEST ACKNOWLEDGEMENT (HARQ-ACK) CODEBOOK FOR MULTI-SLOT PHYSICAL DOWNLINK SHARED CHANNEL (PDSCH) TRANSMISSION

(71) Applicant: Lenovo (Beijing) Limited, Beijing (CN)

(72) Inventors: Haipeng Lei, Beijing (CN); Yu Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 355 days.

(21) Appl. No.: 18/246,916

(22) PCT Filed: Sep. 29, 2020

(86) PCT No.: PCT/CN2020/118658
§ 371 (c)(1),
(2) Date: Mar. 28, 2023

(87) PCT Pub. No.: WO2022/067461
PCT Pub. Date: Apr. 7, 2022

(65) Prior Publication Data
US 2023/0412320 A1    Dec. 21, 2023

(51) Int. Cl.
*H04L 1/1829*    (2023.01)

(52) U.S. Cl.
CPC .......... *H04L 1/1861* (2013.01); *H04L 1/1854* (2013.01)

(58) Field of Classification Search
CPC ... H04W 28/04; H04W 72/04; H04W 72/042; H04W 88/08; H04L 5/0007; H04L 1/1861; H04L 1/1854
(Continued)

(56) References Cited

U.S. PATENT DOCUMENTS

| 2016/0029367 A1* | 1/2016 | Papasakellariou | H04W 72/23 370/329 |
| 2020/0267597 A1* | 8/2020 | Huang | H04L 1/1812 |

(Continued)

FOREIGN PATENT DOCUMENTS

| CN | 109787720 A | * | 5/2019 | H04L 1/18 |
| CN | 111034093 A | * | 4/2020 | H04L 1/18 |

(Continued)

OTHER PUBLICATIONS

PCT/CN2020/118658 , "International Preliminary Report on Patentability", PCT Application No. PCT/CN2020/118658, Apr. 13, 2023, 5 pages.

(Continued)

*Primary Examiner* — Asad M Nawaz
*Assistant Examiner* — Sanjay K Dewan
(74) *Attorney, Agent, or Firm* — FIG. 1 Patents

(57) ABSTRACT

Embodiments of the present disclosure relate to methods and apparatuses for determining a HARQ-ACK codebook for multi-slot PDSCH transmission. According to some embodiments of the disclosure, a method for wireless communications performed by a UE may include: receiving a first plurality of downlink control information (DCI) formats for scheduling a second plurality of physical downlink shared channel (PDSCH) transmissions on at least one serving cell of the UE; receiving the second plurality of PDSCH transmissions based on the first plurality of DCI formats; generating a HARQ-ACK codebook based on the indicators in the first plurality of DCI formats; and transmitting the HARQ-ACK codebook.

20 Claims, 11 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2021/0144688 A1* | 5/2021 | Lin ........................ | H04L 1/1864 |
| 2022/0140954 A1* | 5/2022 | Kim ....................... | H04L 1/1861 |
| | | | 370/329 |
| 2023/0180228 A1* | 6/2023 | Tian ....................... | H04W 72/23 |
| | | | 370/329 |
| 2024/0080858 A1* | 3/2024 | Yuan ..................... | H04L 1/1812 |

FOREIGN PATENT DOCUMENTS

| | | | | | |
|---|---|---|---|---|---|
| CN | 111432477 | A | * | 7/2020 | ............... H04L 5/00 |
| EP | 3281349 | B1 | * | 6/2021 | ........... H04L 1/0045 |
| JP | WO2018/235270 | A1 | * | 12/2018 | ........... H04W 72/23 |
| WO | 2018235270 | A1 | | 12/2018 | |
| WO | WO-2021146702 | A1 | * | 7/2021 | ........... H04L 1/1614 |

OTHER PUBLICATIONS

PCT/CN2020/118658 , "International Search Report and Written Opinion", US Application No. PCT/CN2020/118658, Jun. 30, 2021, 6 pages.

\* cited by examiner

METHOD AND APPARATUS FOR DETERMINING HYBRID AUTOMATIC REPEAT REQUEST ACKNOWLEDGEMENT (HARQ-ACK) CODEBOOK FOR MULTI-SLOT PHYSICAL DOWNLINK SHARED CHANNEL (PDSCH) TRANSMISSION

TECHNICAL FIELD

Embodiments of the present disclosure generally relate to wireless communication technology, and more particularly to hybrid automatic repeat request acknowledgement (HARQ-ACK) codebook determination for multi-slot physical downlink shared channel (PDSCH) transmission.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a base station (BS) may transmit data signals to user equipment (UE) via a physical downlink shared channel (PDSCH). The PDSCH transmission to the UE may be a dynamic PDSCH or a semi-persistent scheduling (SPS) PDSCH. In dynamic scheduling, a BS may transmit, to a UE, downlink control information (DCI) (e.g., DCI format 1_0 or DCI format 1_1) via a corresponding physical downlink control channel (PDCCH). In SPS, a PDSCH transmission is configured to a UE by a BS through higher layer signaling, such as, for example, radio resource control (RRC) signaling. The transmission may occur at predetermined time instances and with predetermined parameters, as informed by the higher layer signaling or the DCI for activating the SPS transmission. The BS may transmit a DCI format for the SPS PDSCH release to the UE. In response to reception of the DCI format for releasing the SPS PDSCH, the UE shall transmit an acknowledgement (ACK) to the BS to indicate to the BS that the UE has successfully received the DCI format.

A UE may transmit hybrid automatic repeat request acknowledgement (HARQ-ACK) feedback (e.g., included in a HARQ-ACK codebook) corresponding to PDSCH transmissions through a physical uplink shared channel (PUSCH) or a physical uplink control channel (PUCCH).

There is a need for handling HARQ-ACK feedback determination in a wireless communication system.

SUMMARY

Some embodiments of the present disclosure provide a method for wireless communications performed by a user equipment (UE). The method may include: receiving a first plurality of downlink control information (DCI) formats for scheduling a second plurality of physical downlink shared channel (PDSCH) transmissions on at least one serving cell of the UE, wherein each of the first plurality of DCI formats schedules one or more PDSCH transmissions of the second plurality of PDSCH transmissions and includes an indicator for the UE to generate a hybrid automatic repeat request acknowledgement (HARQ-ACK) codebook for the second plurality of PDSCH transmissions; receiving the second plurality of PDSCH transmissions based on the first plurality of DCI formats; generating the HARQ-ACK codebook based on the indicators in the first plurality of DCI formats; and transmitting the HARQ-ACK codebook.

Some embodiments of the present disclosure provide a method for wireless communications performed by a base station (BS). The method may include: transmitting, to a user equipment (UE), a first plurality of downlink control information (DCI) formats for scheduling a second plurality of physical downlink shared channel (PDSCH) transmissions on at least one serving cell of the UE, wherein each of the first plurality of DCI formats schedules one or more PDSCH transmissions of the second plurality of PDSCH transmissions and includes an indicator for the UE to generate a hybrid automatic repeat request acknowledgement (HARQ-ACK) codebook for the second plurality of PDSCH transmissions; transmitting the second plurality of PDSCH transmissions based on the first plurality of DCI formats; and receiving the HARQ-ACK codebook.

In some embodiments of the present disclosure, the indicator may indicate an accumulative number of dynamically scheduled PDSCH transmissions plus the number of physical downlink control channel (PDCCH) transmissions for semi-persistent scheduling (SPS) PDSCH release, up to current serving cell and current PDCCH monitoring occasion. In some embodiments of the present disclosure, the indicator may indicate an accumulative number of dynamically scheduled PDSCH transmissions and semi-persistent scheduling (SPS) PDSCH transmissions plus the number of physical downlink control channel (PDCCH) transmissions for SPS PDSCH release, up to current serving cell and current PDCCH monitoring occasion. In some embodiments of the present disclosure, the indicator may indicate an accumulative number of dynamically scheduled transport blocks (TBs) plus the number of physical downlink control channel (PDCCH) transmissions for semi-persistent scheduling (SPS) PDSCH release, up to current serving cell and current PDCCH monitoring occasion. In some embodiments of the present disclosure, the indicator may indicate an accumulative number of dynamically scheduled transport blocks (TBs) and TBs carried on semi-persistent scheduling (SPS) PDSCH transmissions plus the number of physical downlink control channel (PDCCH) transmissions for SPS PDSCH release, up to current serving cell and current PDCCH monitoring occasion.

In some embodiments of the present disclosure, the indicator may indicate a total number of dynamically scheduled PDSCH transmissions plus the number of physical downlink control channel (PDCCH) transmissions for semi-persistent scheduling (SPS) PDSCH release, up to current PDCCH monitoring occasion. In some embodiments of the present disclosure, the indicator may indicate a total number of dynamically scheduled PDSCH transmissions and semi-persistent scheduling (SPS) PDSCH transmissions plus the number of physical downlink control channel (PDCCH) transmissions for SPS PDSCH release, up to current PDCCH monitoring occasion. In some embodiments of the present disclosure, the indicator may indicate a total number of dynamically scheduled transport blocks (TBs) plus the number of physical downlink control channel (PDCCH) transmissions for semi-persistent scheduling (SPS) PDSCH release, up to current PDCCH monitoring occasion. In some embodiments of the present disclosure, the indicator may indicate a total number of dynamically scheduled transport blocks (TBs) transmissions and TBs carried on semi-persistent scheduling (SPS) PDSCH transmissions plus the number of physical downlink control channel (PDCCH) transmissions for SPS PDSCH release, up to current PDCCH monitoring occasion.

In some embodiments of the present disclosure, each of the first plurality of DCI formats may include $\lceil \log_2(N(2+1)) \rceil$ bits for accommodating the indicator, and wherein N denotes the maximum number of PDSCH transmissions scheduled by a DCI format of the first plurality of DCI formats. In some embodiments of the present disclosure, each of the first plurality of DCI formats may include $\lceil \log_2(N(2+1)) \rceil$ bits for accommodating the indicator, and wherein N denotes the maximum number of TBs scheduled by a DCI format of the first plurality of DCI formats.

In some embodiments of the present disclosure, the HARQ-ACK codebook may at least include a first plurality of fields. Each of the first plurality of fields may be associated with a corresponding DCI format of the first plurality of DCI formats and may include N HARQ-ACK information bits corresponding to PDSCH transmissions scheduled by the corresponding DCI format, and wherein N is the maximum number of PDSCH transmissions scheduled by a DCI format of the first plurality of DCI formats. In some examples, the first plurality of fields may be ordered based on the indicators in the first plurality of DCI formats. In some examples, in response to the number of PDSCH transmissions scheduled by a corresponding DCI format being smaller than N, negative acknowledgement (NACK) bits may be appended in a field associated with the corresponding DCI format till total N HARQ-ACK information bits in the field associated with the corresponding DCI format.

In some embodiments of the present disclosure, the HARQ-ACK codebook may at least include a first plurality of field. Each of the first plurality of fields may be associated with a corresponding DCI format of the first plurality of DCI formats and may include a respective HARQ-ACK information bit corresponding to PDSCH transmissions scheduled by the corresponding DCI format. In response to the number of PDSCH transmissions scheduled by a corresponding DCI format being larger than one, the HARQ-ACK information bit in the field associated with the corresponding DCI format may be generated by the UE via performing HARQ-ACK bundling among HARQ-ACK information bits for the PDSCH transmissions scheduled by the corresponding DCI format.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
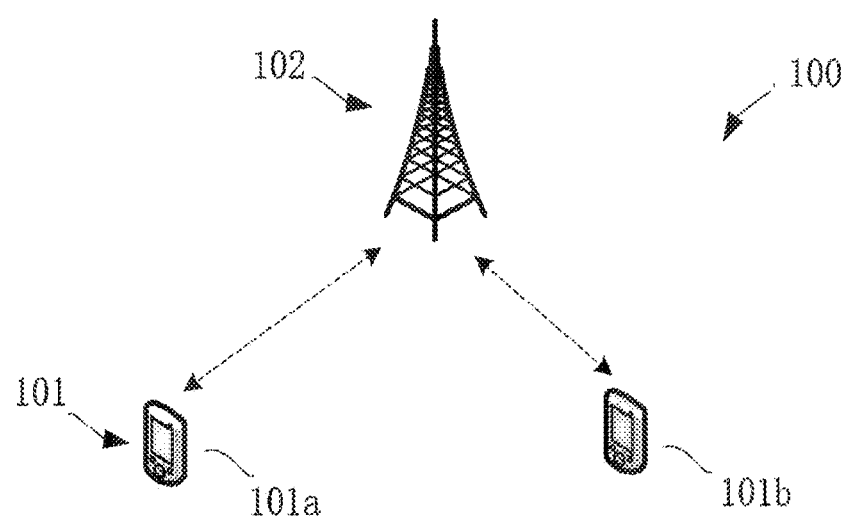
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness hands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

NR Release 17 will expand the frequency range to 71 GHz. Due to the phase noise effect at a high frequency band, higher subcarrier spacing (SCS) may be specified for the purpose of reliability. For example, 240 kHz SCS, 480 kHz SCS, 960 kHz SCS, and even 1920 kHz SCS may be considered. It is known that the higher SCS, the shorter the duration of a slot. For example, Table 1 below shows exemplary slot durations for different SCS. It should be understood that Table 1 is only for illustrative purposes, and should not be construed as limiting the embodiments of the present disclosure.

TABLE 1

Slot durations for different SCS

| $\mu$ | $\Delta f = 2^\mu \cdot 15[kHz]$ | slot duration |
|---|---|---|
| 0 | 15 | 1 ms |
| 1 | 30 | 0.5 ms |
| 2 | 60 | 0.25 ms |
| 3 | 120 | 0.125 ms |
| 4 | 240 | 0.0625 ms |
| 5 | 480 | 31.25 μs |
| 6 | 960 | 15.625 μs |

In the above Table 1, parameter $\mu$ is associated with the SCS (listed in the second column of Table 1). For example, "$\mu=4$" may indicate a SCS of 240 kHz, and the slot duration for such SCS is 0.0625 ms.

As shown in above Table 1, the duration of a single slot for, for example, 480 kHz SCS or 960 kHz SCS is quite short. Since the duration of a single slot is quite short, UE power consumption will become a major problem when a UE is configured to monitor the physical downlink control channel (PDCCH) per slot. When a UE is configured to monitor a PDCCH over a period of several slots, according to the current scheduling framework, for example, one PDCCH in one slot can schedule only one PDSCH or one PUSCH within one slot, whereby such scheduling framework may lead to resource waste due to some slots being unscheduled.

In some embodiments of the present disclosure, a solution to solve the above problems is to allow a single DCI format to schedule multiple slots when a relatively high SCS is applied. For example, multi-PUSCH scheduling may be supported. That is, a single DCI format can schedule multiple PUSCHs, which can save DCI overhead and even avoid the risk of losing the channel in the case of an unlicensed spectrum. In some examples, in addition to multi-PUSCH scheduling, multi-PDSCH scheduling can also be supported. That is, a single DCI format can schedule multiple PDSCHs.

On the other hand, considering that the processing capability of a UE may not linearly increase with increased SCS, for example, a fast Fourier transform (FFT) size of 4096 and a maximum of 275 resource blocks (RBs) are still kept unchanged, and the UE has to be provided with more hybrid automatic repeat request (HARQ) processes in order to avoid new stop-and-wait progresses in the time domain. In this sense, not only is the DCI overhead for indicating a certain HARQ process increased, but also the soft buffer size at the UE side has to be increased which would lead to an increased expense for the UE. Hence, the existing maximum number (e.g., 16) of HARQ processes has to be maintained.

When the multi-PUSCH scheduling (or multi-PDSCHs scheduling) mechanism is applied to high SCS, if the multiple PUSCHs (or PDSCHs) scheduled by a single DCI format carry different transport blocks (TBs) (e.g., each PUSCH may carry a respective TB), a relatively high overhead may be brought about. This is because each TB may have an independent cyclic redundancy check (CRC) and an independent HARQ processing flow, which, in the case of high SCS, implies an increase in the number of HARQ processes as mentioned above.

In some embodiments of the present disclosure, a solution to solve this problem is to allow the transmission of a single TB on a single PUSCH or PDSCH occupying multiple consecutive slots so that the existing maximum number of HARQ processes can be maintained and extra overhead can also be avoided.

Figure 2:
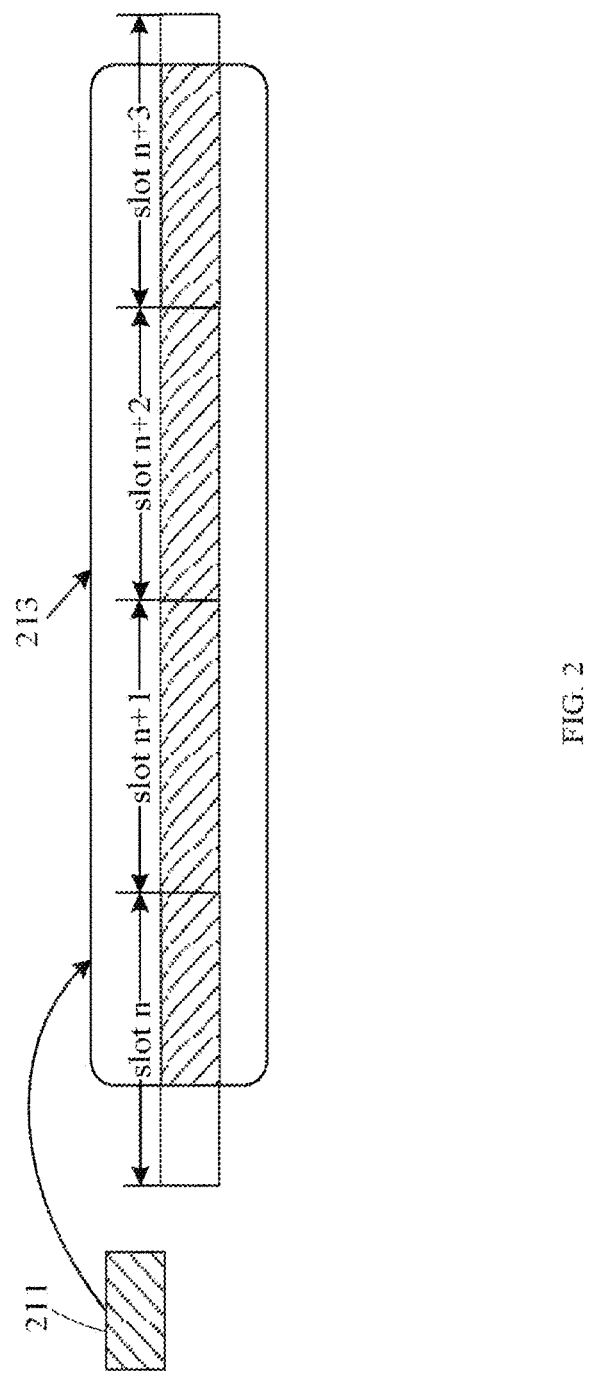
FIG. 2 illustrates a schematic diagram of a DCI format scheduling a DL or UL transmission(s) in accordance with some embodiments of the present disclosure.

FIG. 2 illustrates a schematic diagram of a DCI format scheduling a DL or UL transmission(s) in accordance with some embodiments of the present disclosure. It should be understood that FIG. 2 is only for illustrative purposes, and should not be construed as limiting the embodiments of the present disclosure.

As shown in FIG. 2, DCI format 211 may schedule TB 213 on multiple slots (e.g., slot n to slot n+3). In this way, a single HARQ process is needed for the multiple slots (e.g., slot n to slot n+3). The TB 213 may be carried on a PDSCH or a PUSCH. In some embodiments, DCI format 211 may only schedule one PDSCH or PUSCH, which carries at least TB 213. For example, the PDSCH or PUSCH may only carry TB 213. Or the PDSCH or PUSCH may carry TB 213 and another TB (not shown in FIG. 2) immediately following TB 213. In some other embodiments, DCI format 211 may schedule more than one PDSCH or PUSCH, each of which may carry at least one TB. For example, DCI format 211 may schedule two PDSCHs, the first PDSCH carries TB 213 and the second PDSCH (not shown in FIG. 2) carries another TB (not shown in FIG. 2) immediately following TB 213.

In some embodiments of the present disclosure, in the case that the maximum number of HARQ processes is not exceeded, a single DCI format may be allowed to schedule a PDSCH occupying one slot or multiple PDSCHs carrying multiple different TBs over multiple consecutive slots (e.g., each of the multiple PDSCHs may carry a respective TB over a respective slot). This would bring scheduling flexibility to some extent.

Figure 3:
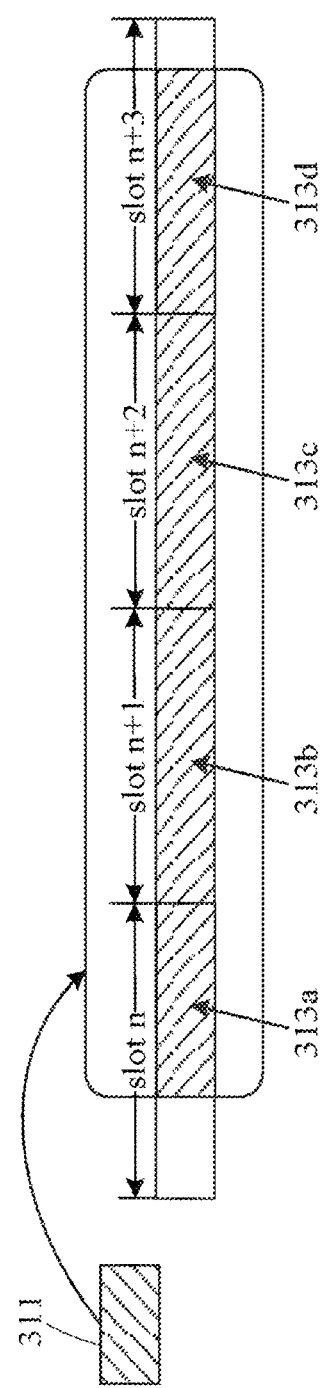
FIG. 3 illustrates a schematic diagram of a DCI format scheduling a DL or UL transmission(s) in accordance with some embodiments of the present disclosure.

FIG. 3 illustrates a schematic diagram of a DCI format scheduling a DL or UL transmission(s) in accordance with some embodiments of the present disclosure. It should be understood that FIG. 3 is only for illustrative purposes, and should not be construed as limiting the embodiments of the present disclosure.

As shown in FIG. 3, DCI format 311 may schedule multiple PDSCHs (or PDSCHs) carrying multiple TBs (e.g., TB 313a to TB 313d) on multiple slots (e.g., slot n to slot n+3). For example, slot n may be allocated to TB 313a, slot n+1 may be allocated to TB 313b, slot n+2 may be allocated to TB 313c, and slot n+3 may be allocated to TB 313d. In some embodiments, a single PDSCH may carry only one TB. For example, TB 313a to TB 313d may be respectively carried on PDSCH #A, PDSCH #A+1, PDSCH #A+2, and PDSCH #A+3. In this scenario, four HARQ processes are needed for the 4 PDSCHs, and a single HARQ-ACK information bit may be required for each PDSCH transmission.

In some other embodiments, a single PDSCH may carry more than one (e.g., two) TBs. For example, TB 313a and TB 313b may be carried on PDSCH #B and TB 313c and TB 313d may be carried on PDSCH #+1. In this scenario, two HARQ-ACK information bits may be required for each PDSCH transmission.

To sum up, there may be, but not limited to, the following scheduling possibilities:
(1) one DCI format schedules one PDSCH within one slot;
(2) one DCI format schedules one PDSCH over multiple slots;
(3) one DCI format schedules multiple PDSCHs over multiple slots, wherein the multiple PDSCHs carry repetitions of one TB; and
(4) one DCI format schedules multiple PDSCHs over multiple slots, wherein the multiple PDSCHs carry different TBs.

FIG. 2 illustrates an example of the above scheduling possibility (2) and FIG. 3 illustrates an example of the above scheduling possibility (4). In scheduling possibility (4), a single HARQ-ACK information bit may be required for the multiple PDSCHs scheduled by the same DCI format.

Figure 4:
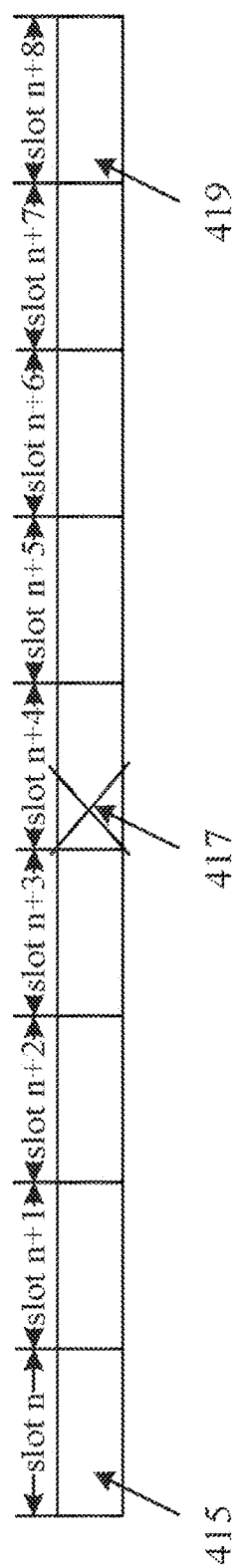
FIG. 4 illustrates a schematic diagram of a DCI format scheduling a DL transmission(s) in accordance with some embodiments of the present disclosure.

The above scheduling possibilities may provide sufficient scheduling flexibility for the network. However, it also brings HARQ-ACK codebook ambiguity between the UE and the BS. FIG. 4 illustrates a schematic diagram of a DCI format scheduling a DL transmission(s) in accordance with some embodiments of the present disclosure.

Referring to FIG. 4, assuming that a UE is configured with a dynamic HARQ-ACK codebook and is configured to monitor the PDCCH every four slots, for example, monitoring the PDCCH in slot n, slot n+4, slot n+8, and so on. In some instances, the UE may receive two DCI formats, for example, DCI format 415 and DCI format 419 in slot n and slot n+8, respectively.

Each DCI format may include downlink assignment index (DAI) information to facilitate HARQ-ACK feedback for PDSCH transmission(s) scheduled by the corresponding DCI format. In the case of a single carrier, the DAI information may include a counter DAI. The counter DAI in a DCI format may denote the accumulative number of PDCCH monitoring occasions for PDSCH scheduling or indicating a DL SPS release, up to the current serving cell and the current PDCCH monitoring occasion. The accumulative number may be incremented first in the ascending order of the serving cell index and then in the ascending order of the candidate PDCCH monitoring occasion index.

In the case of carrier aggregation (CA), the DAI information may include at least one of a counter DAI and a total DAI. The total DAI may denote the total number of PDCCH monitoring occasions for PDSCH scheduling or indicating a DL SPS release, up to the current PDCCH monitoring occasion. The total DAI may be updated from one PDCCH monitoring occasion to the next PDCCH monitoring occasion.

Assuming that the UE is configured with a single serving cell, in the case that the DAI value of DCI format 415 is equal to 1 and the DAI value of DCI format 419 is equal to 3, the UE can identify that a DCI format (e.g., DCI format 417) in slot n+4 is missed based on the two DAI values in DCI formats 415 and 419. However, since one DCI format may schedule one PDSCH or multiple PDSCHs, the UE cannot figure out how many PDSCHs are scheduled by the missing DCI, and thus cannot determine the HARQ-ACK codebook.

Solutions for determining a HARQ-ACK codebook to support flexible DL transmission (e.g., PDSCH) scheduling (e.g., one or multiple PDSCHs can be scheduled by a single DCI format) are provided. More details on the embodiments of the present disclosure will be illustrated in the following text in combination with the appended drawings.

In some embodiments of the present disclosure, a DCI format may include an indicator (hereinafter, "first indicator") indicating an accumulative number of dynamically scheduled PDSCH transmissions plus the number of physical downlink control channel (PDCCH) transmissions for semi-persistent scheduling (SPS) PDSCH release, up to the current serving cell and the current PDCCH monitoring occasion. The accumulative number may be incremented first in the ascending order of the serving cell index and then in the ascending order of the candidate PDCCH monitoring occasion index.

In some other embodiments of the present disclosure, the above-mentioned first indicator may indicate an accumulative number of dynamically scheduled PDSCH transmissions and SPS PDSCH transmissions plus the number of PDCCH transmissions for a SPS PDSCH release, up to the current serving cell and the current PDCCH monitoring occasion. The accumulative number may be incremented first in the ascending order of the serving cell index and then in the ascending order of the candidate PDCCH monitoring occasion index.

In some embodiments of the present disclosure, the first indicator may be indicated in the DAI field of a DCI format.

Assuming that a DCI format can schedule a maximum of N PDSCHs, $\lceil \log_2(N(2+1)) \rceil$ bits are required in the DCI format for indicating the above-mentioned first indicator. In some embodiments, the value of N may be configured by a radio resource control (RRC) signaling message.

The $\lceil \log_2(N(2+1)) \rceil$ bits can represent the value of the above-mentioned first indicator from 1 to a maximum of $2^{\lceil \log_2(N(2+1)) \rceil}$. In this way, a UE can identify an error case of, for example, two back-to-back (e.g., two consecutive) missing DCI formats and know the number of already scheduled PDSCHs as well as the number of PDCCH transmissions for a DL SPS release. In the case one or two back-to-back DCI formats are missed, a UE can still know how many dynamic PDSCHs plus the number of PDCCH transmissions for DL SPS release are missed based on the detected DCI formats. The first indicator may also be used to order the HARQ-ACK information bits for the scheduled PDSCHs or PDCCH indicating DL SPS release, so that the UE can determine the HARQ-ACK codebook.

For HARQ-ACK multiplexing in one HARQ-ACK codebook, denoting the current accumulative number of PDSCHs (e.g., either dynamically scheduled PDSCHs or both dynamically scheduled PDSCHs and SPS PDSCHs according to the above definitions of the first indicator) plus the number of PDCCH transmissions for SPS PDSCH release as Y, when Y exceeds $2^{\lceil \log_2(N(2+1)) \rceil}$, a modular operation (e.g., Y mod $2^{\lceil \log_2(N(2+1)) \rceil}$) is performed at a BS, and the result of the modular operation is mapped to the $2^{\lceil \log_2(N(2+1)) \rceil}$-bit first indicator in a DCI format. Therefore, the same value of the first indicator is used to indicate Y=1, $1+2^{\lceil \log_2(N(2+1)) \rceil}$, $1+2*2^{\lceil \log_2(N(2+1)) \rceil}$, . . . , or Y=2, $2+2^{\lceil \log_2(N(2+1)) \rceil}$, $2+2*2^{\lceil \log_2(N(2+1)) \rceil}$, . . . , or Y=$2^{\lceil \log_2(N(2+1)) \rceil}$, $2*2^{\lceil \log_2(N(2+1)) \rceil}$, $3*2^{\lceil \log_2(N(2+1)) \rceil}$, . . . .

At the UE side, based on the first indicator in the detected DCI format, the UE can derive the value of Y up to the current serving cell and the current PDCCH monitoring occasion.

Figure 5:
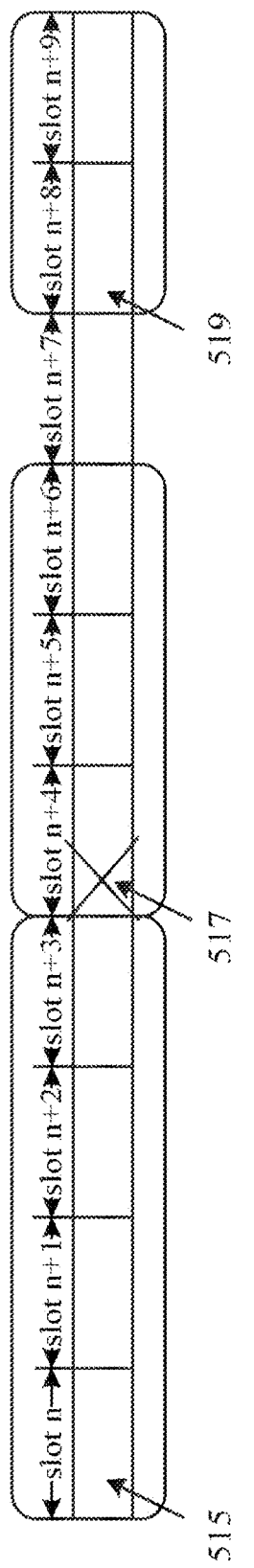
FIG. 5 illustrates a schematic diagram of a DCI format scheduling a DL transmission(s) in accordance with some embodiments of the present disclosure.
Figure 6:
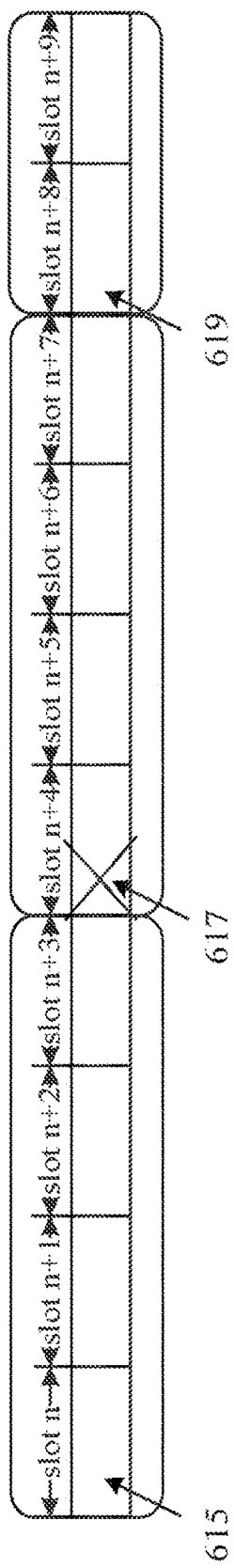
FIG. 6 illustrates a schematic diagram of a DCI format scheduling a DL transmission(s) in accordance with some embodiments of the present disclosure.

FIGS. 5 and 6 illustrate schematic diagrams of a DCI format scheduling a DL transmission(s) in accordance with some embodiments of the present disclosure.

In the example of FIGS. 5 and 6, it is assumed that a UE is configured with a single serving cell and a single DCI format can schedule a maximum of 4 PDSCHs (i.e., N=4) with each PDSCH carrying a different TB(s). In this example, 4 bits are required for indicating the value of the first indicator with a range from 1 to 16. When Y exceeds 16, a modular operation (Y mod 16) is performed at a BS, and the result of the modular operation is indicated by the 4 bits for the first indicator in a DCI format. In this case, the same value of the first indicator is used to indicate Y=1, 17, 33, . . . , or Y=2, 18, 34, . . . , or Y=16, 32, 48, . . . . At the UE side, based on the 4-bit first indicator in the DCI format, a UE can derive the value of Y.

For example, the UE can determine the value of Y based on Table 2 below. It should be understood that Table 2 is only for illustrative purposes, and should not be construed as limiting the embodiments of the present disclosure.

TABLE 2

| Value of first indicator in DCI format | | |
| --- | --- | --- |
| First indicator MSB-->LSB | Value of first indicator | No. of dynamically scheduled PDSCHs (or dynamically scheduled PDSCHs and SPS PDSCHs) plus No. of PDCCHs for DL SPS release, denoted as Y and Y ≥ 1 |
| 0, 0, 0, 0 | 1 | (Y − 1)mod16 + 1 = 1 |
| 0, 0, 0, 1 | 2 | (Y − 1)mod16 + 1 = 2 |
| 0, 0, 1, 0 | 3 | (Y − 1)mod16 + 1 = 3 |
| 0, 0, 1, 1 | 4 | (Y − 1)mod16 + 1 = 4 |
| 0, 1, 0, 0 | 5 | (Y − 1)mod16 + 1 = 5 |
| 0, 1, 0, 1 | 6 | (Y − 1)mod16 + 1 = 6 |
| 0, 1, 1, 0 | 7 | (Y − 1)mod16 + 1 = 7 |
| 0, 1, 1, 1 | 8 | (Y − 1)mod16 + 1 = 8 |
| 1, 0, 0, 0 | 9 | (Y − 1)mod16 + 1 = 9 |
| 1, 0, 0, 1 | 10 | (Y − 1)mod16 + 1 = 10 |
| 1, 0, 1, 0 | 11 | (Y − 1)mod16 + 1 = 11 |
| 1, 0, 1, 1 | 12 | (Y − 1)mod16 + 1 = 12 |
| 1, 1, 0, 0 | 13 | (Y − 1)mod16 + 1 = 13 |
| 1, 1, 0, 1 | 14 | (Y − 1)mod16 + 1 = 14 |
| 1, 1, 1, 0 | 15 | (Y − 1)mod16 + 1 = 15 |
| 1, 1, 1, 1 | 16 | (Y − 1)mod16 + 1 = 16 |

For example, in the above Table 2, the first indicator may be a binary "0001," which corresponds to the value of the first indicator being 2 and indicates Y=2, 18, 34, . . . (i.e., (Y−1)mod 16+1=2).

Referring to FIG. 5, a BS may transmit a plurality of DCI formats (e.g., DCI formats 515 to 519) to a UE. For example, at the BS side, when DCI format 515 transmitted in slot n schedules 4 PDSCHs, the value of the first indicator in DCI format 515 may be set to 4 for indicating the 4 PDSCHs scheduled up to the current PDCCH monitoring occasion of DCI format 515. When DCI format 517 transmitted in slot n+4 schedules 3 PDSCHs, the value of the first indicator in DCI format 517 may be set to 7 for indicating the accumulative 7 PDSCHs scheduled up to the current PDCCH monitoring occasion of DCI format 517. When DCI format 519 transmitted in slot n+8 schedules 2 PDSCHs, the value of the first indicator may be set to 9 for indicating the accumulative 9 PDSCHs scheduled up to the current PDCCH monitoring occasion of DCI format 519.

Still referring to FIG. 5, at the UE side, it is assumed that the UE is configured to monitor PDCCH every four slots, for example, monitoring PDCCH in slot n, slot n+4, slot n+8, and so on. The UE may receive only two DCI formats, for example, DCI format 515 and DCI format 519, and miss DCI format 517. Based on the value of the first indicator in DCI format 519, the UE can identify that there are 9 PDSCHs scheduled up to the monitoring occasion of DCI format 519. Further based on the value of the first indicator in DCI format 515, the UE can determine there are three PDSCHs missed from slot n+4 to slot n+7.

In the case that a single HARQ-ACK information bit corresponds to one PDSCH, the UE can determine the HARQ-ACK codebook size of 9 bits, with each bit corresponding to one of the 9 PDSCHs. For example, denoting the HARQ-ACK codebook as {b0, b1, b2, b3, b4, b5, b6, b7, b8}, where b0 b1, b2, b3 correspond to the four PDSCHs scheduled by the DCI format 515, b7 and b8 correspond to the two PDSCHs scheduled by the DCI format 519, and b4, b5 and b6 are three NACK bits corresponding to the three PDSCHs scheduled by the missed DCI format 517.

In the case that a maximum of two TBs can be transmitted by a single PDSCH, two HARQ-ACK information bits are required for each PDSCH and a single HARQ-ACK information bit is generated per transport block (TB). As a result, the UE can determine the HARQ-ACK codebook size of 18 bits, with every two bits corresponding to a respective one of the 9 PDSCHs. In this case, each of b0 to b8 may include two bits, and b4, b5 and b6 are six NACK bits corresponding to the three PDSCHs scheduled by the missed DCI format 517.

Referring to FIG. 6, a BS may transmit a plurality of DCI formats (e.g., DCI formats 615 to 619) to a UE. DCI format 615 may schedule one PDSCH on 4 slots (e.g., slots n to n+3), DCI format 617 may schedule two PDSCHs on 4 slots (e.g., slots n+4 to n+7) and DCI format 619 may schedule two PDSCHs on 2 slots (e.g., slots n+8 to n+9). In this case, the values of the first indicators in DCI format 615, DCI format 617 and DCI format 619 are 1, 3 and 5, respectively, to indicate the accumulative number of dynamic PDSCHs.

Assuming that the UE only receives DCI format 615 and DCI format 619 and misses DCI format 617, based on the value of the first indicator in DCI format 619, the UE can identify that there are 5 PDSCHs scheduled up to monitoring occasion of DCI format 619. Further based on the value of the first indicator in DCI format 615, the UE can determine that there are two PDSCHs missed from slot n+4 to slot n+7.

In the case that a single HARQ-ACK information bit corresponds to one PDSCH, the UE can determine the HARQ-ACK codebook size of 5 bits, with each bit corresponding to one of the 5 PDSCHs. For example, denoting the HARQ-ACK codebook as {b0, b1, b2, b3, b4}, where b0 corresponds to the PDSCH scheduled by the DCI format 615, b3 and b4 corresponds to the two PDSCHs scheduled by the DCI format 619, and b1 and b2 are two NACK bits corresponding to the two PDSCHs scheduled by the missed DCI format 617.

In the case that a maximum of two TBs can be transmitted by a single PDSCH, two HARQ-ACK information bits are required for each PDSCH and a single HARQ-ACK information bit is generated per transport block (TB). As a result, the UE can determine the HARQ-ACK codebook size of 10 bits, with every two bits corresponding to a respective one of the 5 PDSCHs. In this case, each of b0 to b4 may include two bits, and b1 and b2 are four NACK bits corresponding to the two PDSCHs scheduled by the missed DCI format 517.

Although the above examples illustrate the usage of the first indicator in combination with a single carrier application scenario, it should be appreciated by persons skilled in the art that the first indicator can also be applied to the CA application scenario.

Based on the first indicator, the UE can determine not only the number of PDSCHs scheduled by the missed DCI, but also the HARQ-ACK information bit position in the HARQ-ACK codebook.

In some other embodiments of the present disclosure, when a single DCI format can schedule a maximum of one PDSCH on one or more slots, the existing design of counter DAI can be reused. That is, the HARQ-ACK codebook can be determined based on the counter DAI indicated in the DCI formats. There is no need to introduce the first indicator into the DCI format in these embodiments since the value of the first indicator is the same as that of the counter DAI.

In some other embodiments of the present disclosure, the above-mentioned first indicator may indicate an accumulative number of dynamically scheduled transport blocks (TBs) plus the number of PDCCH transmissions for the SPS PDSCH release, up to the current serving cell and the current PDCCH monitoring occasion. In yet other embodiments of the present disclosure, the above-mentioned first indicator may indicate an accumulative number of dynamically scheduled TBs and TBs carried on SPS PDSCH transmissions plus the number of PDCCH transmissions for the SPS PDSCH release, up to the current serving cell and the current PDCCH monitoring occasion. In the above embodiments, the accumulative number may be incremented first in the ascending order of the serving cell index and then in the ascending order of the candidate PDCCH monitoring occasion index. These embodiments can be applied to application scenarios where a DCI format schedules multiple PDSCHs carrying the same TB (e.g., the same or different repetitions of the same TB) or multiple different TBs.

Assuming that a DCI format can schedule a maximum of M TBs, $\lceil \log_2(M(2+1)) \rceil$ bits are required in the DCI format for indicating the above-mentioned first indicator. In some embodiments, the value of M may be configured by a RRC signaling message.

The $\lceil \log_2(M(2+1)) \rceil$ bits can represent the value of the first indicator from 1 to a maximum of $2^{\lceil \log_2(M(2+1)) \rceil}$. In this way, a UE can identify an error case of two back-to-back (e.g., two consecutive) missing DCI formats and know the number of already scheduled TBs as well as the number of PDCCH transmissions for the DL SPS release. In the case one or two back-to-back DCI formats are missed, a UE can know how many dynamic TBs plus the number of PDCCH transmissions for the DL SPS release are missed based on the detected DCI formats. The first indicator may also be used to order the HARQ-ACK information bits for the scheduled TBs or PDCCH indicating the DL SPS release, so that the UE can determine the HARQ-ACK codebook.

For HARQ-ACK multiplexing in one HARQ-ACK codebook, denoting the current accumulative number of TBs (e.g., either TBs dynamically scheduled by the DCI format or both TBs dynamically scheduled by the DCI format and TBs carried on SPS PDSCHs, according to the above definitions of the first indicator) plus the number of PDCCH transmissions for the SPS PDSCH release as Z, when Z exceeds $2^{\lceil \log_2(M(2+1)) \rceil}$, a modular operation (e.g., Z mod $2^{\lceil \log_2(M(2+1)) \rceil}$) is performed at a BS, and the result of the modular operation is mapped to the $2^{\lceil \log_2(M(2+1)) \rceil}$-bit first indicator in a DCI format. Therefore, the same value of the first indicator is used to indicate Z=1, $1+2^{\lceil \log_2(M(2+1)) \rceil}$, $1+2*2^{\lceil \log_2(M(2+1)) \rceil}$, . . . , or Z=2, $2+2^{\lceil \log_2(M(2+1)) \rceil}$, $2+2*2^{\lceil \log_2(M(2+1)) \rceil}$, . . . , or Z=$2^{\lceil \log_2(M(2+1)) \rceil}$, $2*2^{\lceil \log_2(M(2+1)) \rceil}$, $3*2^{\lceil \log_2(M(2+1)) \rceil}$, . . . .

At the UE side, based on the first indicator in the detected DCI format, the UE can derive the value of Z up to the current serving cell and the current PDCCH monitoring occasion. The value of Z and the determination of the HARQ-ACK codebook are similar to those described above with respect to FIGS. 5 and 6, and thus are omitted herein.

In some embodiments of the present disclosure, a DCI format may include an indicator (hereinafter, "second indicator") indicating a total number of dynamically scheduled PDSCH transmissions plus the number of PDCCH transmissions for the SPS PDSCH release, up to the current PDCCH monitoring occasion. In some other embodiments of the present disclosure, the second indicator may indicate a total number of dynamically scheduled PDSCH transmissions and SPS PDSCH transmissions plus the number of PDCCH transmissions for the SPS PDSCH release, up to the current PDCCH monitoring occasion. The second indicator may be updated from one PDCCH monitoring occasion to the next PDCCH monitoring occasion.

In some embodiments of the present disclosure, the second indicator may be indicated in the total DAI field of a DCI format. In some embodiments of the present disclosure, the second indictor may be employed in combination with the first indicator, which may be indicated in the counter DAI field of the DCI format. In some embodiments of the present disclosure, the second indictor may be employed while the first indicator may not be employed.

Assuming that a DCI format can schedule a maximum of N PDSCHs, $\lceil \log_2(N(2+1)) \rceil$ bits are required in the DCI format for indicating the above-mentioned second indicator. In some embodiments, the value of N may be configured by a RRC signaling message. The $\lceil \log_2(N(2+1)) \rceil$ bits represent the value of the second indicator value from 1 to a maximum of $2^{\lceil \log_2(N(2+1)) \rceil}$. In this way, a UE can know the number of already scheduled PDSCHs as well as the number of PDCCH transmissions for the DL SPS release.

For HARQ-ACK multiplexing in one HARQ-ACK codebook, denoting the current total number of dynamically scheduled PDSCHs (e.g., either dynamically scheduled PDSCHs or both dynamically scheduled PDSCHs and SPS PDSCHs according to the above definitions of the second indicator) plus the number of PDCCH transmissions for the SPS PDSCH release as Y', when Y' exceeds $2^{\lceil \log_2(N(2+1)) \rceil}$, a modular operation (e.g., Y' mod $2^{\lceil \log_2(N(2+1)) \rceil}$) is performed at a BS, and the result of the modular operation is mapped to the $2^{\lceil \log_2(N(2+1)) \rceil}$-bit second indicator in a DCI format. Therefore, the same value of the second indicator is used to indicate Y'=1, $1+2^{\lceil \log_2(N(2+1)) \rceil}$, $1+2*2^{\lceil \log_2(N(2+1)) \rceil}$, ..., or Y'=2, $2+2^{\lceil \log_2(N(2+1)) \rceil}$, $2+2*2^{\lceil \log_2(N(2+1)) \rceil}$, ..., or Y'=$2^{\lceil \log_2(N(2+1)) \rceil}$, $2*2^{\lceil \log_2(N(2+1)) \rceil}$, $3*2^{\lceil \log_2(N(2+1)) \rceil}$, ....

At the UE side, based on the second indicator in the detected DCI format, the UE can derive the value of Y' up to the current PDCCH monitoring occasion.

Figure 7:
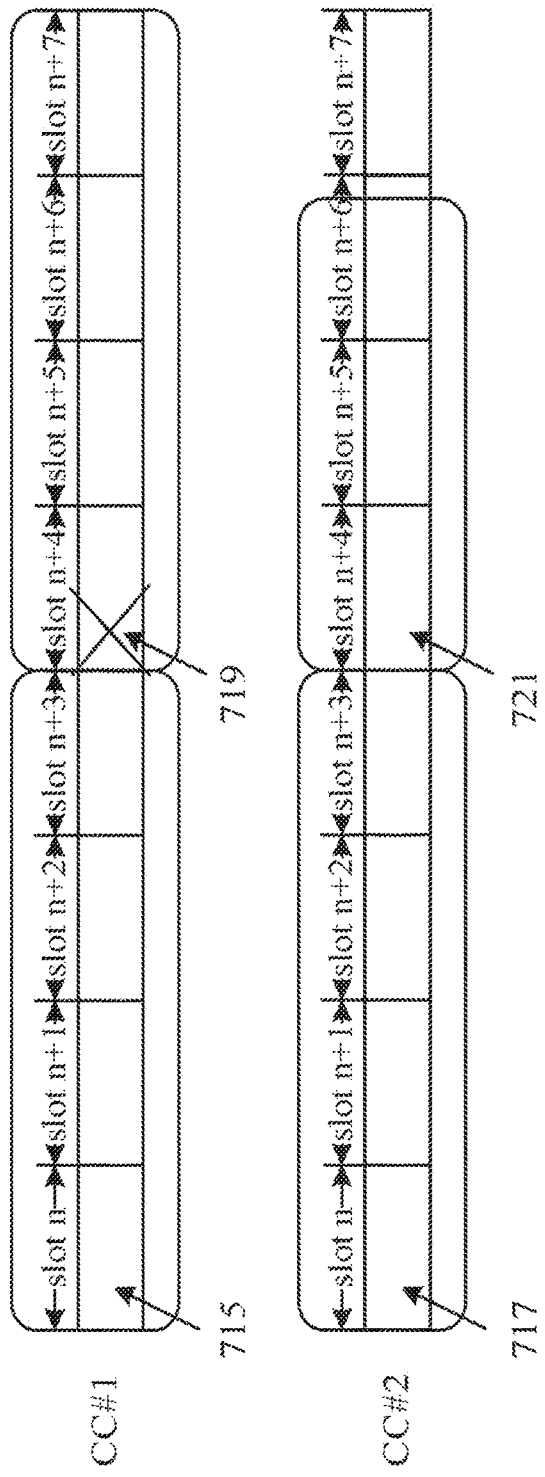
FIG. 7 illustrates a schematic diagram of a DCI format scheduling a DL transmission(s) in accordance with some embodiments of the present disclosure.

FIG. 7 illustrates a schematic diagram of a DCI format scheduling a DL transmissions) in accordance with some embodiments of the present disclosure.

Referring to FIG. 7, a UE is configured with two serving cells (e.g., CC #1 and CC #2) and a single DCI format can schedule a maximum of 4 PDSCHs (i.e., N=4) with each PDSCH carrying a different TB. In this example, 4 bits are required for indicating the value of the second indicator with a range from 1 to 16. When Y' exceeds 16, a modular operation (Y' mod 16) is performed at a BS, and the result of the modular operation in indicated by the 4 bits for the second indicator in a DCI format. In this case, the same value of the second indicator is used to indicate Y'=1, 17, 33, ..., or Y'=2, 18, 34, ..., or Y'=16, 32, 48, .... At the UE side, based on the 4-bit second indicator in the DCI format, a UE can derive the value of Y'.

For example, the UE can determine the value of Y' based on Table 3 below. It should be understood that Table 3 is only for illustrative purposes, and should not be construed as limiting the embodiments of the present disclosure

TABLE 3

Value of second indicator in DCI format

| Second indicator MSB-->LSB | Value of the second indicator | No. of dynamically scheduled PDSCHs (or dynamically scheduled PDSCHs and SPS PDSCHs) plus No. of PDCCHs for DL SPS release, denoted as Y' and Y' ≥ 1 |
|---|---|---|
| 0, 0, 0, 0 | 1 | (Y' − 1) mod 16 + 1 = 1 |
| 0, 0, 0, 1 | 2 | (Y' − 1) mod 16 + 1 = 2 |
| 0, 0, 1, 0 | 3 | (Y' − 1) mod 16 + 1 = 3 |
| 0, 0, 1, 1 | 4 | (Y' − 1) mod 16 + 1 = 4 |
| 0, 1, 0, 0 | 5 | (Y' − 1) mod 16 + 1 = 5 |
| 0, 1, 0, 1 | 6 | (Y' − 1) mod 16 + 1 = 6 |
| 0, 1, 1, 0 | 7 | (Y' − 1) mod 16 + 1 = 7 |
| 0, 1, 1, 1 | 8 | (Y' − 1) mod 16 + 1 = 8 |
| 1, 0, 0, 0 | 9 | (Y' − 1) mod 16 + 1 = 9 |
| 1, 0, 0, 1 | 10 | (Y' − 1) mod 16 + 1 = 10 |
| 1, 0, 1, 0 | 11 | (Y' − 1) mod 16 + 1 = 11 |
| 1, 0, 1, 1 | 12 | (Y' − 1) mod 16 + 1 = 12 |
| 1, 1, 0, 0 | 13 | (Y' − 1) mod 16 + 1 = 13 |
| 1, 1, 0, 1 | 14 | (Y' − 1) mod 16 + 1 = 14 |
| 1, 1, 1, 0 | 15 | (Y' − 1) mod 16 + 1 = 15 |
| 1, 1, 1, 1 | 16 | (Y' − 1) mod 16 + 1 = 16 |

For example, in the above Table 3, the second indicator may be a binary "0001," which corresponds to the value of the second indicator being 2 and indicates Y'=2, 18, 34, ... (i.e., (Y'−1) mod 16+1=2).

Still referring to FIG. 7, a BS may transmit a plurality of DCI formats (e.g., DCI formats 715 to 721) to a UE. For example, at the BS side, when DCI format 715 transmitted on CC #1 in slot n schedules one PDSCH on four slots (e.g., slots n to n+3) and DCI format 717 transmitted on CC #2 in slot a schedules two PDSCHs on four slots (e.g., slots n to n±3), the value of the second indicator in DCI formats 715 and 717 may be set to 3 to indicate a total of 3 PDSCHs scheduled up to the current PDCCH monitoring occasion of DCI format 715 (as well as DCI format 717). When DCI format 719 transmitted on CC #1 in slot n+4 schedules four PDSCHs on four slots (e.g., slots n+4 to n+7) and DCI format 721 transmitted on CC #2 in slot n+4 schedules three PDSCHs on three slots (e.g., slots n+4 to n+6), the value of the second indicator in DCI formats 719 and 721 may be set to 10 to indicate a total of 10 PDSCHs scheduled up to the current PDCCH monitoring occasion of DCI format 719 (as well as DCI format 721).

In addition, assuming that the serving cell index of CC #2 is greater than that of CC #1, the counter DAI in DCI format 715 may be set as 1 to indicate the accumulative number of PDCCH monitoring occasions for PDSCH scheduling, up to current serving cell CC #1 and the current PDCCH monitoring occasion of DCI format 715. Similarly, the counter DAI in DCI format 717 to 721 may be set as 2, 3, and 4, respectively.

At the UE side, it is assumed that the UE is configured to monitor the PDCCH every four slots, for example, monitoring PDCCH in slot n, slot n+4, and so on. The UE may receive only three DCI formats, for example, DCI format 715, DCI format 717 and DCI format 721, and miss DCI format 719. Based on the value of counter DAI in DCI format 715, DCI format 717 and DCI format 721, the UE can identify that there is one DCI missed on CC #1 in slot n+4. Based on the value of the second indicator in DCI format 715 (or DCI format 717) and DCI format 721, the UE can identify that there are 4 PDSCHs scheduled by the missed DCI.

In the case that a single HARQ-ACK information bit corresponds to one PDSCH, then the UE can determine the HARQ-ACK codebook size of 10 bits, with each bit corresponding to one of the 10 PDSCHs. For example, denoting the HARQ-ACK codebook as {b0, b1, b2, b3, b4, b5, b6, b7, b8, b9}, where b0 corresponds to the one PDSCH scheduled by DCI format 715, b1 and b2 correspond to the two PDSCHs scheduled by DCI format 717, b7, b8 and b9 correspond to the three PDSCHs scheduled by DCI format 717, and b3, b4, b5 and b6 are four NACK bits corresponding to the four PDSCHs scheduled by the missed DCI format 719.

In the case that a maximum of two TBs can be transmitted by a single PDSCH, two HARQ-ACK information bits are required for each PDSCH and a single HARQ-ACK information bit is generated per transport block (TB). As a result, the UE can determine the HARQ-ACK codebook size of 20 bits, with every two bits corresponding to a respective one of the 10 PDSCHs. In this case, each of b0 to b9 may include two bits, and b3, b4, b5 and b6 are eight NACK bits corresponding to the four PDSCHs scheduled by the missed DCI format 719.

Based on the second indicator, the UE can determine the number of PDSCHs scheduled by the missed DCI.

In some other embodiments of the present disclosure, the above-mentioned second indicator may indicate a total number of dynamically scheduled TBs plus the number of PDCCH transmissions for the SPS PDSCH release, up to the current PDCCH monitoring occasion. In yet other embodiments of the present disclosure, the above-mentioned second indicator may indicate a total number of dynamically scheduled TB transmissions and TBs carried on SPS PDSCH transmissions plus the number of PDCCH transmissions for the SPS PDSCH release, up to the current PDCCH monitoring occasion. The second indicator may be updated from one PDCCH monitoring occasion to the next PDCCH monitoring occasion. These embodiments can be applied to application scenarios where a DCI format schedules multiple PDSCHs carrying the same TB (e.g., the same or different repetitions of the same TB) or multiple different TBs.

Assuming that a DCI format can schedule a maximum of M TBs, $\lceil \log_2(M(2+1)) \rceil$ bits are required in the DCI format for indicating the above-mentioned second indicator. In some embodiments, the value of M may be configured by a RRC signaling message.

The $\lceil \log_2(M(2+1)) \rceil$ bits can represent the value of the second indicator from 1 to a maximum of $2^{\lceil \log_2(M(2+1)) \rceil}$. In this way, a UE can know the number of already scheduled TBs as well as the number of PDCCH transmissions for the DL SPS release.

For HARQ-ACK multiplexing in one HARQ-ACK codebook, denoting the current total number of TBs (e.g., either TBs dynamically scheduled by the DCI format or both TBs dynamically scheduled by the DCI format and TBs carried on SPS PDSCHs, according to the above definitions of the second indicator) plus the number of PDCCH transmissions for the SPS PDSCH release as Z', when Z' exceeds, $2^{\lceil \log_2(M(2+1)) \rceil}$, a modular operation (e.g., Z' mod $2^{\lceil \log_2(M(2+1)) \rceil}$) is performed at a BS, and the result of the modular operation is mapped to the $2^{\lceil \log_2(M(2+1)) \rceil}$-bit second indicator in a DCI format. Therefore, the same value of the second indicator is used to indicate Z'=1, $1+2^{\lceil \log_2(M(2+1)) \rceil}$, $1+2*2^{\lceil \log_2(M(2+1)) \rceil}$, . . . , or Z'=2, $2+2^{\lceil \log_2(M(2+1)) \rceil}$, $2+2*2^{\lceil \log_2(M(2+1)) \rceil}$, . . . , or Z'=$2^{\lceil \log_2(M(2+1)) \rceil}$, $2*2^{\lceil \log_2(M(2+1)) \rceil}$, $3*2^{\lceil \log_2(M(2+1)) \rceil}$, . . . .

At the UE side, based on the second indicator in the detected DCI format, the UE can derive the value of Z' up to the current PDCCH monitoring occasion. The value of Z' and the determination of the HARQ-ACK codebook are similar to those described above with respect to FIG. 7, and thus are omitted herein.

In some embodiments of the present disclosure, a UE may always assume a specific number of PDSCHs scheduled by a single DCI format when the UE determines the corresponding HARQ-ACK codebook. For example, assuming that a DCI format can schedule a maximum of N PDSCHs, a UE may always assume that a DCI format schedules N PDSCHs when the UE determines the HARQ-ACK codebook. In some embodiments, the value of N may be configured by a radio resource control (RRC) signaling message.

In the case that the number of PDSCHs actually scheduled by a DCI format is smaller than N, padding bit (e.g., negative acknowledgement (NACK) bit) may be applied to the HARQ-ACK codebook for these PDSCHs, so as to guarantee the number of HARQ-ACK information bits for the PDSCHs scheduled by the DCI format is always the same.

For example, denoting P as the number of PDCCHs (e.g., DCI formats) with corresponding HARQ-ACK feedback timing indicated in the same slot, the UE may generate a HARQ-ACK codebook for P*N PDSCHs (not taking into account multiple input multiple output (MIMO) and code block group (CBG) based retransmission). In this HARQ-ACK codebook, the HARQ-ACK information bits for the PDSCHs scheduled by one DCI format are grouped together and may include padding bits if the number of scheduled PDSCH is smaller than N. The HARQ-ACK information bits associated with different DCI formats are ordered among the P PDCCHs (e.g., DCI formats) based on the counter DAI of these DCI formats. In this way, every N consecutive HARQ-ACK information bits correspond to PDSCHs scheduled by the same DCI format. In the case that two HARQ-ACK information bits correspond to one PDSCH (e.g., taking MIMO into account), the UE may generate a HARQ-ACK codebook for 2*P*N PDSCHs, with every 2*N consecutive HARQ-ACK information bits correspond to PDSCHs scheduled by the same DCI format.

Based on the DAI (e.g., counter DAI, total DAI, or both) in the DCI formats, when a UE identifies one or more DCI formats are missed, the UE may assume that N PDSCHs are scheduled by each of the missed DCI formats. For a detected DCI format, regardless of how many PDSCHs are actually scheduled, the UE determines the HARQ-ACK feedback for the detected DCI format based on N PDSCHs.

Without any consideration of a multiple input multiple output (MIMO) and code block group (CBG) based retransmission, the final HARQ-ACK codebook size is equal to P*N, where P is the determined number of PDCCHs with corresponding HARQ-ACK feedback timing indicated in the same slot. In this way, even if a DCI is missed, the same understanding on the HARQ-ACK codebook size is maintained at both the UE and BS sides since N PDSCHs are always assumed for a single DCI format.

Figure 8:
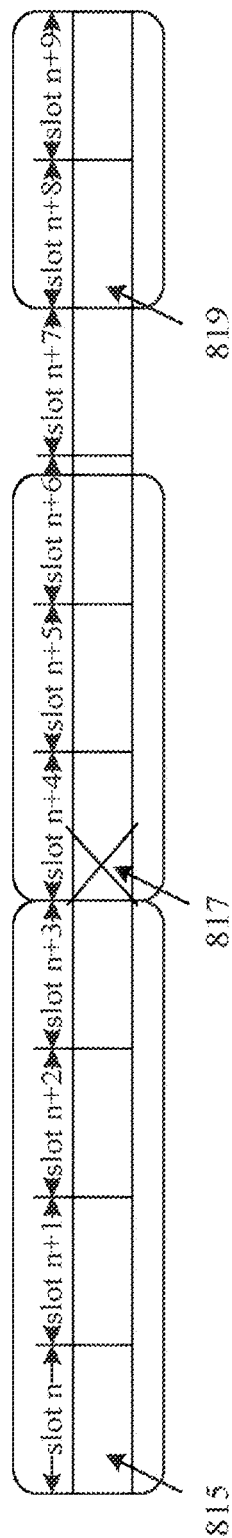
FIG. 8 illustrates a schematic diagram of a DCI format scheduling a DL transmission(s) in accordance with some embodiments of the present disclosure.

FIG. 8 illustrates a schematic diagram of a DCI format scheduling a DL transmission(s) in accordance with some embodiments of the present disclosure.

Referring to FIG. 8, a UE is configured with a single serving cell and a single DCI format can schedule a maximum of 4 PDSCHs (i.e., N=4). A BS may transmit a plurality of DCI formats (e.g., DCI formats 815 to 819) to a UE. For example, DCI format 815 transmitted in slot n may schedule 4 PDSCHs in slots n to slots n+3, DCI format 817 transmitted in slot n+4 may schedule 3 PDSCHs in slots n+4 to slots n+6, and DCI format 819 transmitted in slot n+8 may schedule 2 PDSCHs in slots n+8 to slots n+9. The DAI (e.g., counter DAI) values of DCI formats 815 to 819 may be 1, 2, and 3, respectively.

Without any consideration of MIMO or CBG-based retransmission, a single HARQ-ACK bit may be required for each PDSCH. Regardless of how many PDSCHs are actually scheduled by each DCI format, 4 bits (in the case of FIG. 8, N=4) are required for indicating HARQ-ACK feedback for the PDSCHs scheduled by a single DCI format. Therefore, the UE may determine that the HARQ-ACK codebook size including HARQ-ACK feedback for the PDSCHs scheduled by the above three DCI formats is equal to 3*4=12, where every 4 consecutive bits correspond to the maximum of 4 PDSCHs scheduled by a respective DCI format.

For a detected DCI format, if the number of PDSCHs actually scheduled by the detected DCI format is smaller than 4, the NACK bit(s) is padded at the end of HARQ-ACK information bits for the PDSCHs scheduled by the detected DCI format. For a missed DCI format, 4 NACK bits are generated for the PDSCHs scheduled by the missed DCI format.

For example, the UE may receive only two DCI formats, for example, DCI format 815 and DCI format 819 in slot n and slot n+8, respectively, and miss DCI format 817, The UE can identify that a DCI format is missed. The HARQ-ACK codebook is denoted as {b0, b1, b2, b3, b4, b5, b6, b7, b8, b9, b10, b11}, where b0, b1, b2 and b3 are associated with DCI format 815, b4, b5, b6 and b7 are associated with DCI format 817, and b8, b9, b10, and b11 are associated with DCI format 819. In particular, b0, b1, b2 and b3 are four HARQ-ACK information bits corresponding to the four PDSCHs scheduled by DCI format 815, b4, b5, b6 and b7 are four NACK bits since DCI format 817 is missed, b8 and b9 are two HARQ-ACK information bits corresponding to the two PDSCHs scheduled by DCI format 819, and b10 and b11 are NACK bits as two padding bits.

In the case that all of the three DCI formats are detected, b0, b1, b2 and b3 are four HARQ-ACK information bits corresponding to the four PDSCHs scheduled by DCI format 815, b4, b5, and b6 are three HARQ-ACK information bits corresponding to the three PDSCHs scheduled by DCI format 817, b7 is a NACK bit as a padding bit to guarantee 4 bits generated tier the PDSCHs scheduled by DCI format 817, b8 and b9 are two HARQ-ACK information bits corresponding to the two PDSCHs scheduled by DCI format 819, and b10 and b11 are NACK bits as two padding bits.

In this way, the UE and the BS can always synchronize the understanding on the HARQ-ACK codebook regardless of whether a DCI is missed or not. It should be appreciated by persons skilled in the art that the above method can be similarly applied when taking MIMO, CBG based retransmission, or both into account.

In some embodiments of the present disclosure, a UE may always perform HARQ-ACK bundling among the HARQ-ACK information bits corresponding to the PDSCHs scheduled by the same DCI format when the UE determines the HARQ-ACK codebook. This is especially true considering the very high channel correlation among multiple PDSCHs that are consecutive in the time domain, occupy the same frequency resource in the frequency domain and/or share the same modulation and coding scheme (MCS), and so on. HARQ-ACK bundling would not cause DL performance degradation.

In some embodiments of the present disclosure, HARQ-ACK bundling may be performed in the time domain by logic AND operation among the HARQ-ACK information bits for 2 to N PDSCHs scheduled by the same DCI format, so that the number of HARQ-ACK information bits for the 2 to N PDSCHs scheduled by the same DCI format is equal to the number of HARQ-ACK information bits for a single PDSCH. When a DCI format only schedules a single PDSCH, there is no need to perform the HARQ-ACK bundling. In this way, regardless of how many PDSCHs are actually scheduled by a DCI format, the number of HARQ-ACK information bits for 2 to N PDSCHs scheduled by the same DCI format is always equal to the number of HARQ-ACK information bits for a single PDSCH.

Based on the DAI (e.g., counter DAI, total DAI, or both) in DCI formats, when a UE identifies one or more DCI formats are missed, the UE may insert NACK bit(s) for the one or more missed DCI formats, and the number of NACK bits for each of the missed DCI formats is equal to the number of HARQ-ACK information bits for a single PDSCH. For a detected DCI format, regardless of how many PDSCHs are actually scheduled, a UE performs HARQ-ACK bundling among the HARQ-ACK information bits for the scheduled PDSCHs and generates the number of HARQ-ACK information bits equal to that for a single PDSCH. Without any consideration of MIMO or CBG-based retransmission, the final HARQ-ACK codebook size is equal to P, where P is the determined number of PDCCHs with corresponding HARQ-ACK feedback timing indicated in the same slot. In this way, even if a DCI is missed, the same understanding on HARQ-ACK codebook size is maintained at both the UE and BS sides since the same number of HARQ-ACK information bits is always assumed for the PDSCHs scheduled by a single DCI format.

Referring back to FIG. 8, the UE may receive two DCI formats, for example, DCI format 815 and DCI format 819 in slot n and slot n+8, respectively, and miss DCI format 817. As mentioned above, the DAI values of DCI formats 815 and 819 may be 1 and 3, respectively. Based on the DAI values of DCI formats 815 and 819, the UE can identify that a DCI format is missed.

Without any consideration of MIMO or CBG-based retransmission, a single HARQ-ACK bit may be required for each PDSCH. In this scenario, regardless of how many PDSCHs are actually scheduled by each of three DCI formats, a single HARQ-ACK bit is generated for the PDSCHs scheduled by the same DCI format. That is, HARQ-ACK bundling is performed among the HARQ-ACK information bits for the PDSCHs scheduled by the same DCI format to generate a single HARQ-ACK bit. In the HARQ-ACK codebook, the bundled bits are ordered in ascending order of the DAI (e.g., counter DAI). To put it in the above example, the UE may determine that the HARQ-ACK codebook size is equal to 3 bits. Each of the 3 bits corresponds to PDSCHs scheduled by a corresponding one of the three DCI formats. For a detected DCI format (e.g., DCI format 815), assuming that the number of actually scheduled PDSCHs is X (in the example of FIG. 8, 1<=X<=4), HARQ-ACK bundling is performed among the X HARQ-ACK information bits for the X PDSCHs scheduled by the detected DCI format, so as to generate a single bundled bit. For a missed DCI format (e.g., DCI format 817), a NACK bit is simply used as the bundled bit.

For example, denoting the HARQ-ACK codebook as {b0, b1, b2}, b0=c0 AND c1 AND c2 AND c3, where c0, c1, c2 and c3 are the four HARQ-ACK information bits for the four PDSCHs scheduled by DCI format 815; b1=NACK in the case that DCI format 817 is missed; and b2=e0 AND e1, where e0 and e1 are the two HARQ-ACK information bits for the two PDSCHs scheduled by DCI format 819.

In the case that all of the three DCI formats are detected, denoting the HARQ-ACK codebook as {b0, b1, b2}, b0=c0 AND c1 AND c2 AND c3, where c0, c1, c2 and c3 are the four HARQ-ACK, information bits for the four PDSCHs scheduled by DCI format 815; b1=d0 AND d1 AND d2, where d0, d1, and d2 are the three HARQ-ACK information bits for the three PDSCHs scheduled by DCI format 817; and b2=e0 AND e1, where e0 and e1 are the two HARQ-ACK information bits for the two PDSCHs scheduled by DCI format 819.

It should be understood that two or more HARQ-ACK information bits e.g., two or more ACK or NACK information bits) may be required for each PDSCH transmission in some other examples. For example, in the case that a maximum of two TBs can be transmitted by a single PDSCH, two HARQ-ACK information bits may be required for each PDSCH and a single HARQ-ACK information bit is generated per transport block (TB). However, when spatial bundling is also configured, the two HARQ-ACK information bits for a PDSCH may be spatial bundled first to produce a spatial bundled HARQ-ACK information bit for the PDSCH. As a result, each of b0, b1, and b2 includes a bundled bit after the UE performs spatial bundling for two TBs carried on corresponding PDSCH transmissions scheduled by a corresponding DCI format. Then, HARQ-ACK bundling is performed among b0, b1 and b2 to generate a single bundled bit.

When spatial bundling is not configured, for example, the first bit of b0 may be generated by performing logic AND operation among HARQ-ACK information bits for the first TB of each of the four PDSCH transmissions scheduled by DCI format 815, and the second bit of b0 may be generated by performing logic AND operation among HARQ-ACK information bits for the second TB of each of the four PDSCH transmissions scheduled by DCI format 815. In the case that DCI format 817 is missed, b1 includes two NACK bits. The first bit of b2 may be generated by performing logic AND operation among HARQ-ACK information bits for the first TB of each of the two PDSCH transmissions scheduled by DCI format 819, and the second bit of b2 may be generated by performing logic AND operation among HARQ-ACK information bits for the second TB of each of two four PDSCH transmissions scheduled by DCI format 819.

In this way, the UE and the BS can always synchronize the understanding on the HARQ-ACK codebook regardless of whether a DCI is missed or not. It should be appreciated by persons skilled in the art that the above method can be similarly applied when taking MIMO, CBG based retransmission, or both into account.

Figure 9:
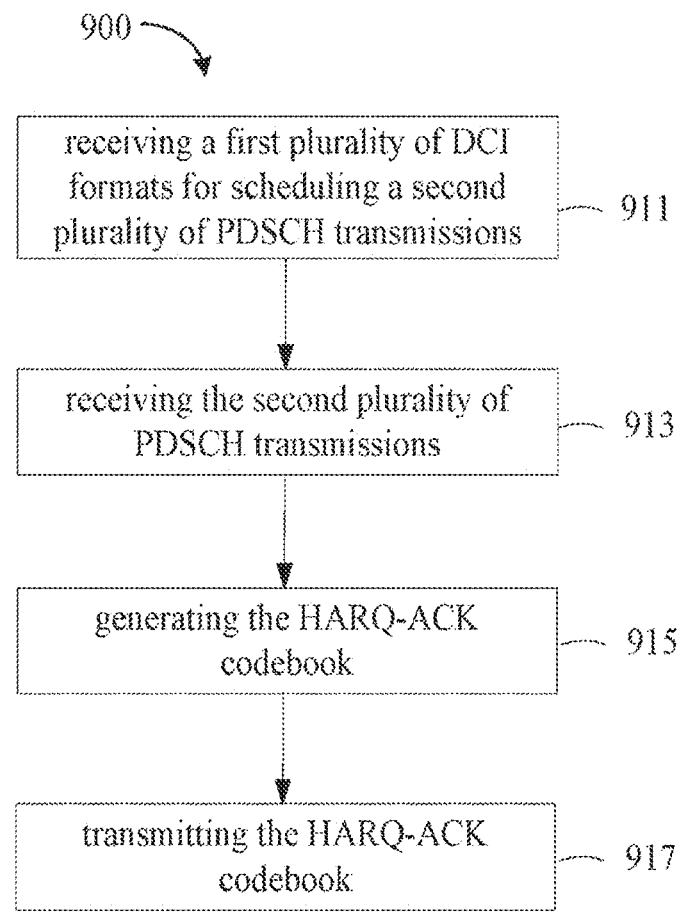
FIG. 9 illustrates a flow chart of an exemplary procedure of wireless communications in accordance with some embodiments of the present disclosure.

FIG. 9 illustrates a flow chart of an exemplary procedure 900 for wireless communications in accordance with some embodiments of the present disclosure. Details described in all of the foregoing embodiments of the present disclosure are applicable for the embodiments shown in FIG. 9. The procedure may be performed by a UE, for example, UE 101 in FIG. 1.

Referring to FIG. 9, in operation 911, a UE may receive a first plurality of DCI formats for scheduling a second plurality of PDSCH transmissions on at least one serving cell of the UE. Each of the first plurality of DCI formats may schedule one or more PDSCH transmissions of the second plurality of PDSCH transmissions. Each of the first plurality of DCI formats may include an indicator for the UE to generate a HARQ-ACK codebook for the second plurality of PDSCH transmissions.

In operation 913, the UE may receive the second plurality of PDSCH transmissions based on the first plurality of DCI formats. In operation 915, the UE may generate the HARQ-ACK codebook based on the indicators in the first plurality of DCI formats.

In some embodiments of the present disclosure, the indicator for the UE to generate the HARQ-ACK codebook may be the first indicator as described above.

In some examples, the indicator for the UE to generate a HARQ-ACK codebook may indicate an accumulative number of dynamically scheduled PDSCH transmissions (or dynamically scheduled PDSCH transmissions and SPS PDSCH transmissions) plus the number of PDCCH transmissions for the SPS PDSCH release, up to the current serving cell and the current PDCCH monitoring occasion. In these examples, the UE may receive a RRC signaling message from the BS, indicating the maximum number (e.g., N) of PDSCH transmissions scheduled by a DCI format. The UE would know the number of bits (e.g., $\lceil \log_2(N(2+1)) \rceil$) in a DCI format for accommodating the indicator.

In some other examples, the indicator for the UE to generate a HARQ-ACK codebook may indicate an accumulative number of dynamically scheduled TBs (or dynamically scheduled TBs and TBs carried on SPS PDSCH transmissions) plus the number of PDCCH transmissions tier the SPS PDSCH release, up to the current serving cell and the current PDCCH monitoring occasion. In these examples, the UE may receive a RRC signaling message from the BS, indicating the maximum number (e.g., M) of TBs scheduled by a DCI format. The UE would know the number of bits (e.g., $\lceil \log_2(M(2+1)) \rceil$) in a DCI format for accommodating the indicator.

In some embodiments of the present disclosure, the indicator for the UE to generate the HARQ-ACK codebook may be the second indicator as described above.

In some examples, the indicator for the UE to generate a HARQ-ACK codebook may indicate a total number of dynamically scheduled PDSCH transmissions (or dynamically scheduled PDSCH transmissions and SPS PDSCH transmissions) plus the number of PDCCH transmissions for the SPS PDSCH release, up to the current PDCCH monitoring occasion. In these examples, the UE may receive a RRC signaling message from the BS, indicating the maximum number (e.g., N) of PDSCH transmissions scheduled by a DCI format. The UE would know the number of bits (e.g., $\lceil \log_2(N(2+1)) \rceil$) in a DCI format for accommodating the indicator.

In some other examples, the indicator for the UE to generate a HARQ-ACK codebook may indicate a total number of dynamically scheduled TBs (or dynamically scheduled TBs and TBs carried on SPS PDSCH transmissions) plus the number of PDCCH transmissions for the SPS PDSCH release, up to the current PDCCH monitoring occasion. In these examples, the UE may receive a RRC signaling message from the BS, indicating the maximum number (e.g., M) of TBs scheduled by a DCI format. The UE would know the number of bits (e.g., $\lceil \log_2(M(2+1)) \rceil$) in a DCI format for accommodating the indicator.

In the above embodiments, based on the indicators in the first plurality of DCI formats, the UE may determine the number of PDSCH transmissions scheduled by the missed DCI format (if any) and generate the HARQ-ACK codebook.

In some embodiments of the present disclosure, the indicator for the UE to generate the HARQ-ACK codebook may be the DAI (e.g., counter DAI, total DAI or both).

In some embodiments of the present disclosure, the UE may always assume a specific number of PDSCHs scheduled by a single DCI format when the UE determines the corresponding HARQ-ACK codebook.

For example, the UE may receive a RRC signaling message from the BS indicating the maximum number (e.g., N) of PDSCH transmissions scheduled by a DCI format. The UE may always assume that a DCI format schedules N PDSCHs when the UE determines the HARQ-ACK codebook. For example, the HARQ-ACK codebook may include a plurality of fields associated with a plurality of DCI formats with corresponding HARQ-ACK feedback timing indicated in the same slot. Each of the plurality of fields may be associated with a corresponding DCI format and may include N HARQ-ACK information bits corresponding to PDSCH transmissions scheduled by the corresponding DCI format. The plurality of fields may be ordered based on the indicators (e.g., counter DAI) in the first plurality of DCI formats.

In the case that the number of PDSCH transmissions scheduled by a DCI format is smaller than N, the UE may fill the field associated with the DCI format with the HARQ-ACK information bits for the scheduled PDSCH transmissions, and pad the field associated with the DCI format with NACK bits till total N HARQ-ACK information bits in the field.

In the case that the UE determines that a DCI format is missed based on, for example, the indicators in the first plurality of DCI formats, the UE may till the field associated with the missed DCI format with N NACK bits.

In some embodiments of the present disclosure, a UE may perform HARQ-ACK bundling among the HARQ-ACK information bits corresponding to the PDSCHs scheduled by the same DCI format when the UE determines the HARQ-ACK codebook.

For example, the HARQ-ACK codebook may include a plurality of fields associated with a plurality of DCI formats with corresponding HARQ-ACK feedback timing indicated in the same slot. Each of the plurality of fields may be associated with a corresponding DCI format and may include a respective HARQ-ACK information bit corresponding to PDSCH transmissions scheduled by the corresponding DCI format. The plurality of fields are ordered based on the indicators (e.g., counter DAI) in the first plurality of DCI formats.

In the case that the number of PDSCH transmissions scheduled by a DCI format is equal to one, the UE may fill the field associated with the DCI format with the HARQ-ACK information bit for the PDSCH transmission scheduled by the DCI format.

In the case that the number of PDSCH transmissions scheduled by a DCI format is larger than one, the UE may perform HARQ-ACK bundling among HARQ-ACK information bits for the PDSCH transmissions scheduled by the DCI format to generate a bundled HARQ-ACK information bit and fill the field associated with the DCI format with the bundled HARQ-ACK information bit.

In the case that the UE determines that a DCI format is missed based on, for example, the indicators in the first plurality of DCI formats, the UE may fill the field associated with the missed DCI format with a NACK bit.

In operation 917, the UE may transmit the HARQ-ACK codebook to the BS.

It should be appreciated by persons skilled in the art that the sequence of the operations in exemplary procedure 900 may be changed and some of the operations in exemplary procedure 900 may be eliminated or modified, without departing from the spirit and scope of the disclosure.

Figure 10:
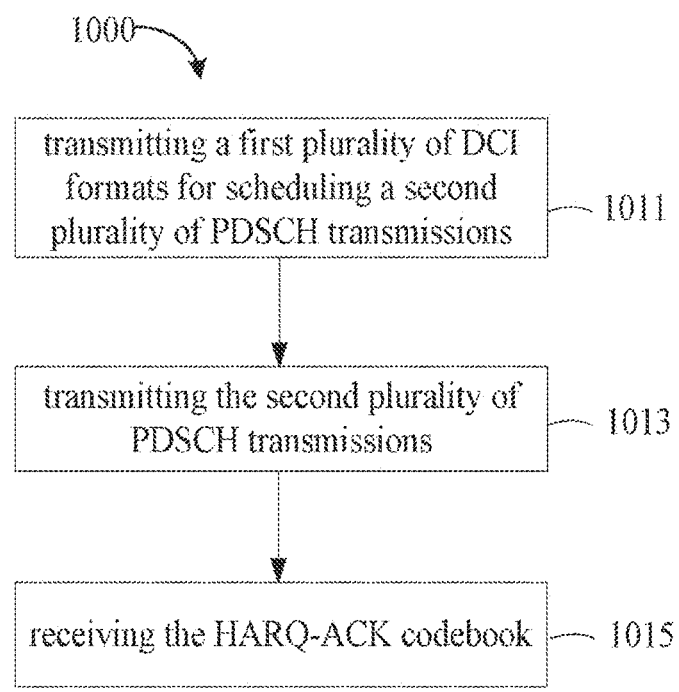
FIG. 10 illustrates a flow chart of an exemplary procedure of wireless communications in accordance with some embodiments of the present disclosure.

FIG. 10 illustrates a flow chart of an exemplary procedure 1000 for wireless communications in accordance with some embodiments of the present disclosure. Details described in all of the foregoing embodiments of the present disclosure are applicable for the embodiments shown in FIG. 10. The procedure may be performed by a BS, for example, BS 102 in FIG. 1.

Referring to FIG. 10, in operation 1011, a BS may transmit, to a UE, a first plurality of DCI formats for scheduling a second plurality of PDSCH transmissions on at least one serving cell of the UE. Each of the first plurality of DCI formats may schedule one or more PDSCH transmissions of the second plurality of PDSCH transmissions. Each of the first plurality of DCI formats may include an indicator for the UE to generate a HARQ-ACK codebook for the second plurality of PDSCH transmissions.

In operation 1013, the BS may transmit the second plurality of PDSCH transmissions based on the first plurality of DCI formats. In operation 1015, the BS may receive the HARQ-ACK codebook.

In some embodiments of the present disclosure, the indicator for the UE to generate the HARQ-ACK codebook may be the first indicator as described above.

In some examples, the indicator for the UE to generate a HARQ-ACK codebook may indicate an accumulative number of dynamically scheduled PDSCH transmissions (or dynamically scheduled PDSCH transmissions and SPS PDSCH transmissions) plus the number of PDCCH transmissions for the SPS PDSCH release, up to the current serving cell and the current PDCCH monitoring occasion. In these examples, the BS may transmit a RRC signaling message to the UE, indicating the maximum number (e.g., N) of PDSCH transmissions scheduled by a DCI format. The UE would know the number of bits (e.g., $\lceil \log_2(N(2+1)) \rceil$) in a DCI format for accommodating the indicator.

In some other examples, the indicator for the UE to generate a HARQ-ACK codebook may indicate an accumulative number of dynamically scheduled TBs (or dynamically scheduled TBs and TBs carried on SPS PDSCH transmissions) plus the number of PDCCH transmissions for the SPS PDSCH release, up to the current serving cell and the current PDCCH monitoring occasion. In these examples, the BS may transmit a RRC signaling message to the UE, indicating the maximum number (e.g., M) of TBs scheduled by a DCI format. The UE would know the number of bits (e.g., $\lceil \log_2(M(2+1)) \rceil$) in a DCI format for accommodating the indicator.

In some embodiments of the present disclosure, the indicator for the UE to generate the HARQ-ACK codebook may be the second indicator as described above.

In some examples, the indicator for the UE to generate a HARQ-ACK codebook may indicate a total number of dynamically scheduled PDSCH transmissions (or dynamically scheduled PDSCH transmissions and SPS PDSCH transmissions) plus the number of PDCCH transmissions for the SPS PDSCH release, up to the current PDCCH monitoring occasion. In these examples, the BS may transmit a RRC signaling message to the UE, indicating the maximum number (e.g., N) of PDSCH transmissions scheduled by a DCI format. The UE would know the number of bits (e.g., $\lceil\log_2(N(2+1))\rceil$) in a DCI format for accommodating the indicator.

In some other examples, the indicator for the UE to generate a HARQ-ACK codebook may indicate a total number of dynamically scheduled TBs (or dynamically scheduled TBs and TBs carried on SPS PDSCH transmissions) plus the number of PDCCH transmissions for the SPS PDSCH release, up to the current PDCCH monitoring occasion. In these examples, the BS may transmit a RRC signaling message to the UE, indicating the maximum number (e.g., M) of TBs scheduled by a DCI format. The UE would know the number of bits (e.g., $\lceil\log_2(M(2+1))\rceil$) in a DCI format for accommodating the indicator.

In some embodiments of the present disclosure, the indicator for the UE to generate the HARQ-ACK codebook may be the DAI (e.g., counter DAI, total DAI or both).

In some embodiments of the present disclosure, the UE and BS may assume that the same number of HARQ-ACK information bits for PDSCHs scheduled by a single DCI format.

For example, the BS may transmit a RRC signaling message to the UE, indicating the maximum number (e.g., N) of PDSCH transmissions scheduled by a DCI format. The BS and the UE may assume that a DCI format schedules N PDSCHs when the UE determines the HARQ-ACK codebook. For example, the HARQ-ACK codebook may at least include a first plurality of fields, and each of the first plurality of fields may be associated with a corresponding DCI format of the first plurality of DCI formats and includes N HARQ-ACK information bits corresponding to PDSCH transmissions scheduled by the corresponding DCI format. The plurality of fields may be ordered based on the indicators in the first plurality of DCI formats.

In the case that the number of PDSCH transmissions scheduled by a DCI format is smaller than N, NACK bits are appended in a field associated with the DCI format till total N HARQ-ACK information bits in the field associated with the DCI format.

In some embodiments of the present disclosure, the HARQ-ACK codebook may include bundled HARQ-ACK information bits for the PDSCH transmissions scheduled by the DCI formats.

For example, the HARQ-ACK codebook may at least include a first plurality of fields, and each of the first plurality of fields may be associated with a corresponding DCI format of the first plurality of DCI formats and includes a respective HARQ-ACK information bit corresponding to PDSCH transmissions scheduled by the corresponding DCI format. The plurality of fields may be ordered based on the indicators in the first plurality of DCI formats.

In the case that the number of PDSCH transmissions scheduled by a DCI format is larger than one, the HARQ-ACK information bit in the field associated with the DCI format may be generated by the UE via performing HARQ-ACK bundling among HARQ-ACK information bits for the PDSCH transmissions scheduled by the DCI format.

In the case that the number of PDSCH transmissions scheduled by a DCI format is equal to one, the UE may fill the field associated with the DCI format with the HARQ-ACK information bit for the PDSCH transmission scheduled by the DCI format.

It should be appreciated by persons skilled in the art that the sequence of the operations in exemplary procedure 1000 may be changed and some of the operations in exemplary procedure 1000 may be eliminated or modified, without departing from the spirit and scope of the disclosure.

Figure 11:
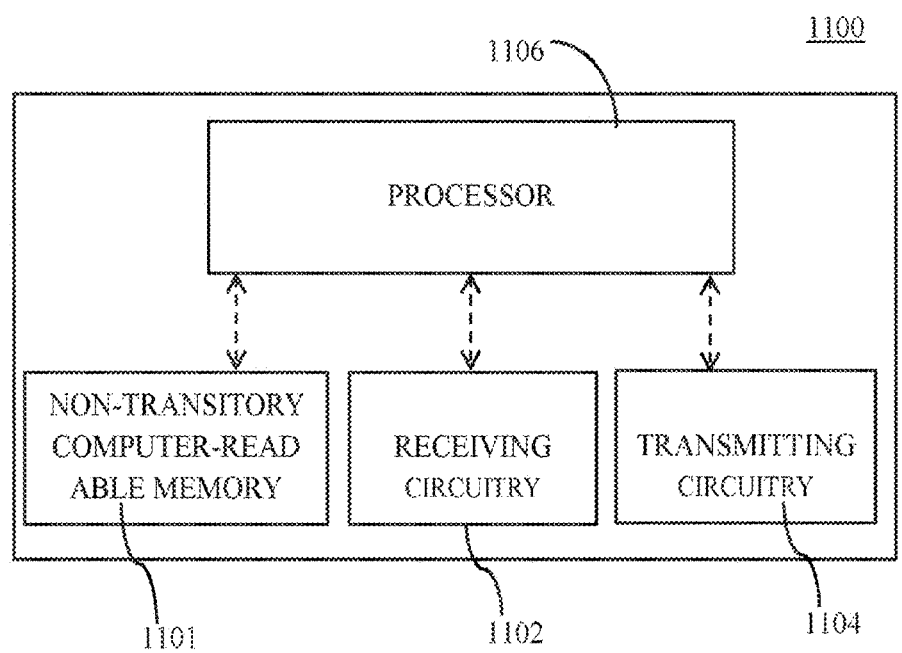
FIG. 11 illustrates a block diagram of an exemplary apparatus in accordance with some embodiments of the present disclosure.

FIG. 11 illustrates a block diagram of an exemplary apparatus 1100 according to some embodiments of the present disclosure.

As shown in FIG. 11, the apparatus 1100 may include at least one non-transitory computer-readable medium 1101, at least one receiving circuitry 1102, at least one transmitting circuitry 1104, and at least one processor 1106 coupled to the non-transitory computer-readable medium 1101, the receiving circuitry 1102 and the transmitting circuitry 1104. The apparatus 1100 may be a base station side apparatus (e.g., a BS) or a communication device (e.g., a UE).

Although in this figure, elements such as the at least one processor 1106, transmitting circuitry 1104, and receiving circuitry 1102 are described in the singular, the plural is contemplated unless a limitation to the singular is explicitly stated. In some embodiments of the present application, the receiving circuitry 1102 and the transmitting circuitry 1104 are combined into a single device, such as a transceiver. In certain embodiments of the present application, the apparatus 1100 may further include an input device, a memory, and/or other components.

In some embodiments of the present disclosure, the non-transitory computer-readable medium 1101 may have stored thereon computer-executable instructions to cause a processor to implement the method with respect to the UEs as described above. For example, the computer-executable instructions, when executed, cause the processor 1106 interacting with receiving circuitry 1102 and transmitting circuitry 1104, so as to perform the operations with respect to the UEs described in FIGS. 1-9.

In some embodiments of the present disclosure, the non-transitory computer-readable medium 1101 may have stored thereon computer-executable instructions to cause a processor to implement the method with respect to the BSs as described above. For example, the computer-executable instructions, when executed, cause the processor 1106 interacting with receiving circuitry 1102 and transmitting circuitry 1104, so as to perform the operations with respect to the BSs described in FIGS. 1-8 and 10.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary tier the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." The wording "the first," "the second" or the like is only used to clearly illustrate the embodiments of the present application, but is not used to limit the substance of the present application.

What is claimed is:

1. A user equipment (UE) for wireless communication, comprising:
   at least one memory; and
   at least one processor coupled with the at least one memory and configured to cause the UE to:
      receive a first plurality of downlink control information (DCI) formats for scheduling a second plurality of physical downlink shared channel (PDSCH) transmissions on at least one serving cell of the UE, wherein each of the first plurality of DCI formats schedules one or more PDSCH transmissions of the second plurality of PDSCH transmissions and includes an indicator for the UE to generate a hybrid automatic repeat request acknowledgement (HARQ-ACK) codebook for the second plurality of PDSCH transmissions, and wherein the indicator indicates a respective quantity of scheduled PDSCH transmissions up to a current serving cell and a current physical downlink control channel (PDCCH) monitoring occasion;
      receive the second plurality of PDSCH transmissions based on the first plurality of DCI formats;
      generate the HARQ-ACK codebook based on the indicators in the first plurality of DCI formats; and
      transmit the HARQ-ACK codebook.

2. The UE of claim 1, wherein the indicator indicates the respective quantity of scheduled PDSCH transmissions plus a respective quantity of PDCCH transmissions for semi-persistent scheduling (SPS) PDSCH release, up to the current serving cell and the current PDCCH monitoring occasion.

3. The UE of claim 1, wherein the indicator further indicates at least one of:
   a respective quantity of dynamically scheduled transport blocks (TBs) plus a respective quantity of PDCCH transmissions for semi-persistent scheduling (SPS) PDSCH release, up to the current serving cell and the current PDCCH monitoring occasion; or
   a respective quantity of dynamically scheduled TBs and TBs carried on SPS PDSCH transmissions plus the respective quantity of PDCCH transmissions for SPS PDSCH release, up to the current serving cell and the current PDCCH monitoring occasion.

4. The UE of claim 1, wherein the indicator further indicates at least one of:
   a respective total quantity of dynamically scheduled PDSCH transmissions plus a respective quantity of PDCCH transmissions for semi-persistent scheduling (SPS) PDSCH release, up to the current PDCCH monitoring occasion; or
   a respective total quantity of dynamically scheduled PDSCH transmissions and semi-persistent scheduling (SPS) PDSCH transmissions plus the respective quantity of PDCCH transmissions for SPS PDSCH release, up to the current PDCCH monitoring occasion.

5. The UE of claim 1, wherein the indicator further indicates at least one of:
   a respective total quantity of dynamically scheduled transport blocks (TBs) plus a respective quantity of PDCCH transmissions for semi-persistent scheduling (SPS) PDSCH release, up to the current PDCCH monitoring occasion; or
   a respective total quantity of dynamically scheduled TBs transmissions and TBs carried on SPS PDSCH transmissions plus the respective quantity of PDCCH transmissions for SPS PDSCH release, up to the current PDCCH monitoring occasion.

6. The UE of claim 1, wherein the HARQ-ACK codebook at least comprises a plurality of fields, and each of the plurality of fields is associated with a corresponding DCI format and includes N HARQ-ACK information bits corresponding to PDSCH transmissions scheduled by the corresponding DCI format, and wherein N is a maximum quantity of PDSCH transmissions scheduled by a DCI format of the first plurality of DCI formats.

7. The UE of claim 6, wherein the plurality of fields are ordered based on the indicators in the first plurality of DCI formats.

8. The UE of claim 6, wherein the at least one processor is further configured to cause the UE to:
   in response to the quantity of PDSCH transmissions scheduled by a corresponding DCI format being smaller than N,
   pad a field associated with the corresponding DCI format with negative acknowledgement (NACK) bits till total N HARQ-ACK information bits in the field associated with the corresponding DCI format.

9. The UE of claim 6, wherein the at least one processor is further configured to cause the UE to:
   determine whether a DCI format is missed based on the indicators in the first plurality of DCI formats; and
   in response to a DCI format being missed, fill the field associated with the missed DCI format with N negative acknowledgement (NACK) bits.

10. The UE of claim 1, wherein the HARQ-ACK codebook at least comprises a plurality of fields, and each of the plurality of fields is associated with a corresponding DCI format and includes a respective HARQ-ACK information bit corresponding to PDSCH transmissions scheduled by the corresponding DCI format.

11. The UE of claim 10, wherein the at least one processor is further configured to cause the UE to:
   in response to a quantity of PDSCH transmissions scheduled by a corresponding DCI format being larger than one,
   perform HARQ-ACK bundling among HARQ-ACK information bits for the PDSCH transmissions scheduled by the corresponding DCI format to generate a bundled HARQ-ACK information bit; and
   fill the field associated with the corresponding DCI format with the bundled HARQ-ACK information bit.

12. The UE of claim 10, wherein the at least one processor is further configured to cause the UE to:
  determine whether a DCI format is missed based on the indicators in the first plurality of DCI formats; and
  in response to a DCI format being missed, fill the field associated with the missed DCI format with a negative acknowledgement (NACK) bit.

13. A base station (BS) for wireless communication, comprising:
  at least one memory; and
  at least one processor coupled with the at least one memory and configured to cause the BS to:
    transmit a first plurality of downlink control information (DCI) formats for scheduling a second plurality of physical downlink shared channel (PDSCH) transmissions on at least one serving cell of a user equipment (UE), wherein each of the first plurality of DCI formats schedules one or more PDSCH transmissions of the second plurality of PDSCH transmissions and includes an indicator for the UE to generate a hybrid automatic repeat request acknowledgement (HARQ-ACK) codebook for the second plurality of PDSCH transmissions, and wherein the indicator indicates a respective quantity of scheduled PDSCH transmissions up to a current serving cell and a current physical downlink control channel (PDCCH) monitoring occasion;
    transmit the second plurality of PDSCH transmissions based on the first plurality of DCI formats; and
    receive the HARQ-ACK codebook.

14. The BS of claim 13, wherein the indicator indicates the respective quantity of scheduled PDSCH transmissions plus a respective quantity of PDCCH transmissions for semi-persistent scheduling (SPS) PDSCH release, up to the current serving cell and the current PDCCH monitoring occasion.

15. The BS of claim 13, wherein the indicator further indicates at least one of:
  a respective quantity of dynamically scheduled transport blocks (TBs) plus a respective quantity of PDCCH transmissions for semi-persistent scheduling (SPS) PDSCH release, up to the current serving cell and the current PDCCH monitoring occasion; or
  a respective quantity of dynamically scheduled TBs and TBs carried on SPS PDSCH transmissions plus the respective quantity of PDCCH transmissions for SPS PDSCH release, up to the current serving cell and the current PDCCH monitoring occasion.

16. The BS of claim 13, wherein the indicator further indicates at least one of:
  a respective total quantity of dynamically scheduled PDSCH transmissions plus a respective quantity of PDCCH transmissions for semi-persistent scheduling (SPS) PDSCH release, up to the current PDCCH monitoring occasion; or
  a respective total quantity of dynamically scheduled PDSCH transmissions and SPS PDSCH transmissions plus the respective quantity of PDCCH transmissions for SPS PDSCH release, up to the current PDCCH monitoring occasion.

17. The BS of claim 13, wherein the indicator further indicates at least one of:
  a respective total quantity of dynamically scheduled transport blocks (TBs) plus a respective quantity of PDCCH transmissions for semi-persistent scheduling (SPS) PDSCH release, up to the current PDCCH monitoring occasion; or
  a respective total quantity of dynamically scheduled TBs transmissions and TBs carried on SPS PDSCH transmissions plus the respective quantity of PDCCH transmissions for SPS PDSCH release, up to the current PDCCH monitoring occasion.

18. A method performed by a user equipment (UE), the method comprising:
  receiving a first plurality of downlink control information (DCI) formats for scheduling a second plurality of physical downlink shared channel (PDSCH) transmissions on at least one serving cell of the UE, wherein each of the first plurality of DCI formats schedules one or more PDSCH transmissions of the second plurality of PDSCH transmissions and includes an indicator for the UE to generate a hybrid automatic repeat request acknowledgement (HARQ-ACK) codebook for the second plurality of PDSCH transmissions, and wherein the indicator indicates a respective quantity of scheduled PDSCH transmissions up to a current serving cell and a current physical downlink control channel (PDCCH) monitoring occasion;
  receiving the second plurality of PDSCH transmissions based on the first plurality of DCI formats;
  generating the HARQ-ACK codebook based on the indicators in the first plurality of DCI formats; and
  transmitting the HARQ-ACK codebook.

19. The method of claim 18, wherein the indicator indicates the respective quantity of scheduled PDSCH transmissions plus a respective quantity of PDCCH transmissions for semi-persistent scheduling (SPS) PDSCH release, up to the current serving cell and the current PDCCH monitoring occasion.

20. A method performed by a base station (BS), the method comprising:
  transmitting a first plurality of downlink control information (DCI) formats for scheduling a second plurality of physical downlink shared channel (PDSCH) transmissions on at least one serving cell of a user equipment (UE), wherein each of the first plurality of DCI formats schedules one or more PDSCH transmissions of the second plurality of PDSCH transmissions and includes an indicator for the UE to generate a hybrid automatic repeat request acknowledgement (HARQ-ACK) codebook for the second plurality of PDSCH transmissions, and wherein the indicator indicates a respective quantity of scheduled PDSCH transmissions up to a current serving cell and a current physical downlink control channel (PDCCH) monitoring occasion;
  transmitting the second plurality of PDSCH transmissions based on the first plurality of DCI formats; and
  receiving the HARQ-ACK codebook.

* * * * *